Figure 16:
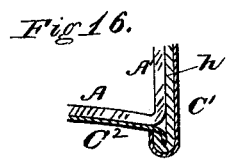
Figure 17:
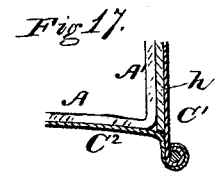
Figure 18:
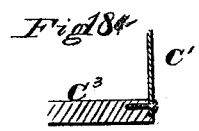
Figure 19:

3 Sheets—Sheet 1.
D. W. NORRIS.
Incased Glass Vessels.
No. 208,628. Patented Oct. 1, 1878.
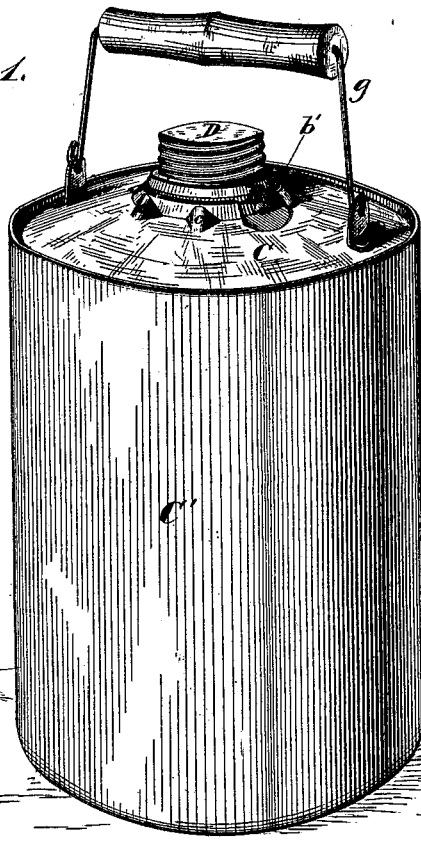
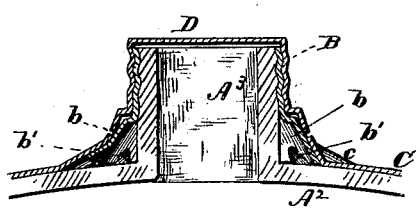
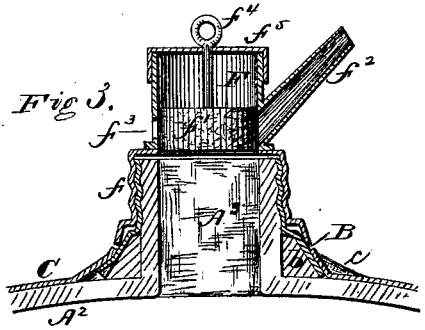
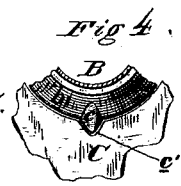
Witnesses.
Harry King
William Blackstock.
Inventor.
Daniel W. Norris
By L. Hill,
His Atty.

3 Sheets—Sheet 2.
D. W. NORRIS.
Incased Glass Vessels.
No. 208,628. Patented Oct. 1, 1878.
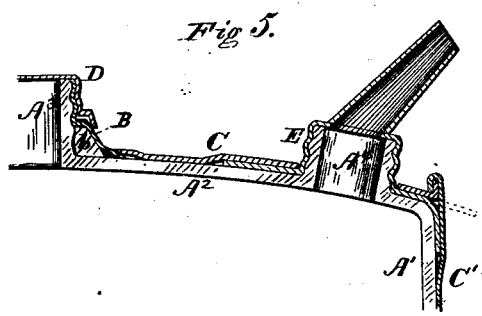
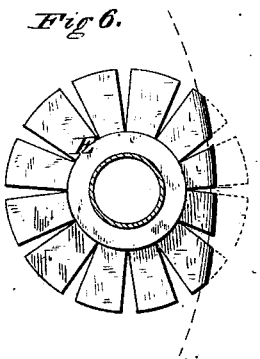
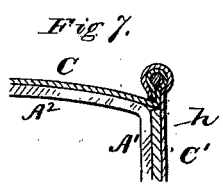
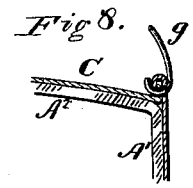
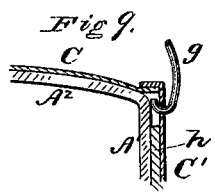
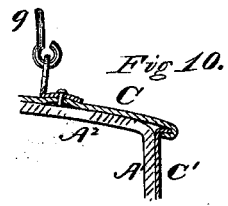
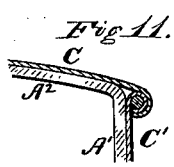
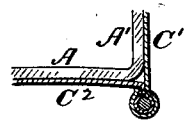
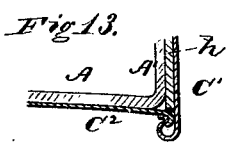
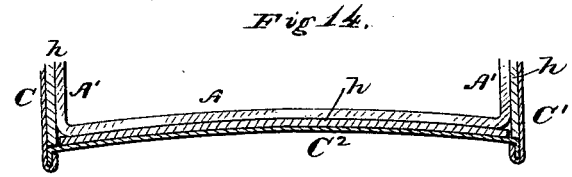
Witnesses.
Harry King
William Blackstock.
Inventor.
Daniel W. Norris
By L. Hill
His atty.

3 Sheets—Sheet 3.

D. W. NORRIS.
Incased Glass Vessels.

No. 208,628. Patented Oct. 1, 1878.

Witnesses.
Harry King
William Blackstock

Inventor.
Daniel W. Norris
By L. Hill
His Atty.

UNITED STATES PATENT OFFICE.

DANIEL W. NORRIS, OF ELGIN, ILLINOIS.

IMPROVEMENT IN INCASED GLASS VESSELS.

Specification forming part of Letters Patent No. 208,628, dated October 1, 1878; application filed September 16, 1878.

*To all whom it may concern:*

Be it known that I, DANIEL W. NORRIS, of Elgin, in the county of Kane and State of Illinois, have invented a new and Improved Incased Glass Vessel for Oils, Chemicals, &c.; and I do hereby declare the following to be a full, clear, and exact description of the same, reference being had to the accompanying drawings, forming part of this specification, in which—

Figure 1 is a perspective view of the whole vessel, a small portion of the top casing being broken away. Figs. 2 and 3 are sections through the filling and discharging neck. Fig. 4 is a sectional perspective view, showing a modification of devices represented in the three preceding figures. Fig. 5 is a sectional view of one-half of the upper part of the incased vessel, showing the filling and pouring necks and their casings and attachments. Fig. 6 is a top view of the pouring-neck casing, a portion of the nozzle being removed. Figs. 7 to 11, inclusive, and 15 represent different modes of joining the sides to the top of the casing. Figs. 12 to 20, inclusive, excepting 15, represent different modes of joining the bottom to the sides of the casing. Figs. 21 to 25, inclusive, represent different modes of attaching the bail or handles, certain modes of which are also shown in Figs. 1, 8, 9, and 10.

Similar letters of reference in the accompanying drawings denote the same parts.

The improvements herein referred to relate to the incasing and protecting of glass, earthen, and other similar vessels by an inclosing-case of sheet metal, on the general principle shown in my Letters Patent No. 195,385, issued September 18, A. D. 1877, and reissued July 9, A. D. 1878.

In the incasing of glass vessels or other similar structures with sheet metal, the soldering of the parts of the casing to each other on the vessel is accomplished with more or less difficulty, which it is the main object of the present improvement to avoid, by constructing a casing the parts of which can be united without soldering.

In applying the casing the parts of which are not soldered together upon a vessel having a neck or necks for filling and discharging, various practical difficulties arise, which are obviated by my present improvements. For example, in my former incased vessels the casing used around the necks, and designated in my patent of September 18, A. D, 1877, by the letters *c c'*, was by the solder so connected to the top casing of the vessel that the frequent screwing and unscrewing of the neck cover or cap *j* could not disconnect said neck-casing from the top casing, nor loosen the neck-casing from the neck; whereas, if solder were not used the neck-casing, being held only by the cement to the neck, would be liable to work loose and ruin the structure. In order to render it practicable, therefore, to use a neck-casing without soldering it to the top casing, I have devised a mode of locking the neck-casing with the top casing, so that the neck-casing cannot be turned and loosened from the neck, and this constitutes one feature of my present improvement.

In applyng this new feature it becomes expedient, though not absolutely necessary, to put the top casing on over the bottom flange of the neck-casing, instead of under it, as shown in my former patent; and in putting it on over said flange it must be drawn down tight and close upon the flange, to prevent liquids from working in under the top casing; hence provision must be made for putting on the said top casing and drawing it down tight upon the top of the vessel; and, therefore, a second feature of my invention consists in the combination, with the neck-casing having a bottom flange and the top casing resting on said flange, of the side casing jointed to the top casing by being turned inward over said top casing, the latter being meanwhile supported by the inclosed vessel, whereby the top casing can be drawn tightly in place and be made to form a tight joint with the neck-casing without the use of solder.

The third feature of my invention relates to that class of incased vessels having independent filling and pouring necks, and in which the pouring-neck is located near the edge of the top; and it consists in means for casing said pouring-neck; and the fourth and last feature consists in the improved mode, as a whole, of incasing vessels, which will be hereinafter fully set forth.

I have shown several modifications of the joints between the side, bottom, and top casings, any one of which may be used, although the form represented in Figs. 1, 5, 8, and 14 is preferred, as being the cheapest and simplest. I have also shown several modes of attaching the lifting-bail or lifting-handles.

Referring to the drawings, A indicates the bottom, $A^1$ the sides, and $A^2$ the top, of the glass or other vessel to be incased; and $A^3$ represents the filling-neck, and $A^4$ the pouring-neck, of said vessel. The pouring-neck may be dispensed with, if preferred by the manufacturer.

Both the filling and pouring necks are provided with an external screw-thread, formed in the glass or other material of the vessel. A screw-casing, B, is fitted to the filling-neck, so as to screw thereon, and is firmly cemented to the neck. The lower portion of the said casing B, instead of fitting tightly to the glass at the lower end of the neck, stands off from the glass, so as to leave an angular recess, $b$, between the casing and glass around the angle or corner at the junction of the neck and top of the vessel, and the recess is filled with cement.

The vessel may be manufactured in such form that the glass will fit and fill the expanded lower portion of the neck-casing, if desired, in which case there will be no recess $b$. Small projections, beads, or flutings $b'$ are made at or near the lower edge of the neck-casing B, which lock with corresponding indentations $c$ in the top casing of the vessel, and thereby prevent the neck-casing from being turned and loosened from the neck of the vessel.

A screw cap or cover, D, screws upon the neck and over the neck-casing to close the filling-orifice.

The top casing of the vessel is shown at C, and is made to fit closely down upon the vessel, or upon any interposed elastic or soft packing that may be employed between the vessel and casing. To fit this top casing to the top of the vessel, it is provided with openings, which permit it to be placed over the filling and pouring necks, the latter projecting up through it, as shown.

The edges of the top casing, around the opening which accommodates the filling-neck, are indented or fluted to match the protuberances $b'$ of the neck-casing B, and to fit closely and tightly over said protuberances. The form of the protuberances and indentations which thus lock those parts together is not material.

The top casing may even be notched, as shown in Fig. 4 at $c^1$, and the neck-casing provided with a tooth or spur to fit the notch, instead of lapping one over the other; but the overlapping joint is recommended. It is further recommended that the edge of the top casing around the opening be turned up slightly all around, so as to form a flange, fitting upon the lower part of the neck-casing B, which will form a tighter joint therewith the more the top casing is drawn or pressed down. It is also recommended that the top of the vessel, after it is incased, be covered with a coat of suitable paint, which will cover and fill the joint between the neck-casing and the top casing.

When a separate pouring-neck is employed a piece of sheet metal, E, is preferably cut into the shape shown in Fig. 6, and screwed upon said neck and cemented thereto. The outer edge of the part E is then turned down over the edge of the glass vessel, as shown in Figs. 5 and 6, which will prevent the neck-casing from afterward becoming loose on the neck. The pouring-nozzle may be permanently attached to said casing E, as shown in Fig. 5, or removable, if desired.

When the filling-neck is to be used as a pouring-neck also, it may be provided with the device shown in Fig. 3, consisting of either a fixed or removable top, F, having a screw-cap, $f$, around its lower edge, to fit over and screw upon the neck or neck-casing, and, further, consisting of a cylindrical cork or stopper, $f^1$, which, when pushed down, closes a pouring-spout, $f^2$, and air-vent $f^3$, and when raised by the rod $f^4$ opens both the spout and vent. The contents of the vessel may then be discharged at any time without removing the screw-cap $f$, and it may be filled by removing the cover $f^5$ of said cap and the cork $f^1$ and introducing the liquid through the neck.

I will now proceed to describe the means which I employ for enabling the top casing to be drawn down tight and close upon the neck-casing and secured in that condition—a matter of great practical importance in the manufacture of these articles. Such means consist in uniting the side casing $C^1$ to the top casing by a joint, which will allow the top casing to come down to and rest directly upon the glass top of the vessel, or the packing around or on the vessel, and be directly supported thereby without the intervention of an internal shoulder or bead in the side casing as a support for the edge of the top casing.

The interior of the side casing thus being clear of all obstructions, and being fitted closely around the vessel, the side casing can be drawn down with much force, thereby drawing down the top casing tightly on the glass top of the vessel and rendering all the joints around the neck close and tight. Indeed, so tightly can the top be thus drawn down that in many cases the locking projections and indentations $b'$ $c$ are not necessary, the friction of the tightly-drawn metal being sufficient to keep the neck-casing from turning.

In the manufacture of the incased vessels the top casing can be first united to the side casing, the vessel then introduced from below, and the bottom afterward inserted and united to the lower edge of the side casing, in which event the top casing can be drawn tightly place by drawing the bottom joint closely; or the bottom may be first secured to the sides, then the vessel inserted, and then the top casing put on and drawn tight by drawing the top joint closely; or the top casing may be first put on, and then the sides and bottom, the top casing being drawn tight by drawing closely either the top or bottom joint.

Figure 23:
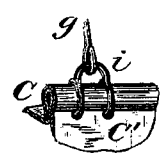
Figure 24:
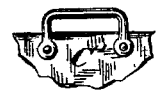
Figure 25:
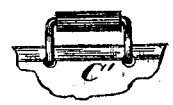

In Figs. 7, 11, 12, 15, and 17, the joints are wired and the sheet-metal bent around the wire. This makes a firm and strong joint, and provides excellent means for supporting and attaching the lifting bail or handles, as represented in Figs. 23, 24, and 25.

In Figs. 5, 8, 14, and 16, the sheets of metal are simply hooked together—a simple and cheap construction, which answers every purpose when the vessel is inserted to support it, and also furnishes a fastening for the bail, as shown at $g$ in Fig. 8, the bail itself serving to lock the two sheets together.

In Figs. 7, 9, 13, 14, 16, and 17, the felt or other packing between the vessel and the sheet-metal casing is represented at $h$. With vessels having a wooden bottom, or bottom casing $c^3$ and sheet-metal side and top casing, the sheet-metal sides may be fastened to the bottom by screws, as in Fig. 18, or rivets or nails, as in Fig. 19, in which case the bottom can be easily removed and replaced, if for any purpose desired. When the edges of the top casing are made of very stiff, strong material, it will be sufficient to make them projecting horizontally, as in Figs. 9, 21, and 22, and bend the side casing in over them. In such cases the bail may be applied as shown at $g$ in any of said drawings or in Fig. 1. When a swinging bail is desired, and the top joint is made to project upward in the form of a flange, wired or not, a good mode of construction is shown in Fig. 23, wherein $i$ is a bent piece of wire, forming an ear to hold the bail, the ends of said bent piece passing through the flange in two places, and being bent around over it to hold the ear in place. The bail is shown at $g$. Instead of the ear and bail, either a fixed handle, as shown in Fig. 24, or a pivoted handle, as in Fig. 25, may be employed.

Figure 20:
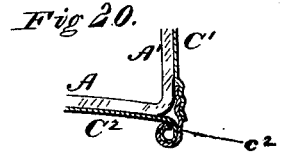
Figure 21:
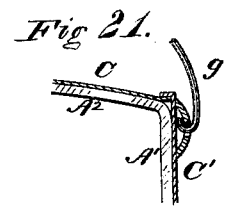
Figure 22:
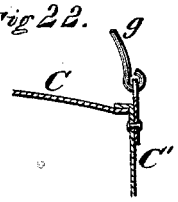

In Fig. 20 the bottom casing $C^2$ is shown connected to the side casing $C^1$ by a rim, $c^2$, of sheet metal, which screws into or upon the lower edge of the side casing, the object being to render the bottom adjustable and removable. The edge of the rim $c^2$ may be fastened to the edge of the bottom casing by bending it over in the manner shown, or by any other suitable fastening; or it might be made in one piece with the bottom, in which case the screw-joint may be at the lower edge or at any other part of the sheet-metal side casing.

In Fig. 16 the packing is represented as bent around with the side casing, the object of which is to support the metal of the latter and prevent it from cracking by being bent too sharply.

Having thus described my invention, I claim as new—

1. In an incased vessel, the combination of the neck-casing B and top casing C, locked together by interlocking projections and recesses, substantially as described, for the purposes specified.

2. In an incased vessel, the combination of a neck casing and top casing locked together, and a side casing jointed to the top casing, said side casing being turned inward over said top casing, and the latter being supported by the inclosed vessel, substantially as described.

3. In an incased vessel having a pouring-neck near the edge of the top, the neck-casing applied to the vessel, with one edge bent down over the side thereof, substantially as described, for the purpose specified.

4. The herein-described mode of incasing vessels—to wit, locking one edge of the side casing with the edge of the top casing, placing the vessel within the casings thus interlocked, then placing the bottom casing within the side casing and against the inclosed vessel, and afterward turning the edge of the side casing inward over the edge of the bottom casing, substantially as described.

DANIEL W. NORRIS.

Witnesses:
　MELVILLE CHURCH,
　WILLIAM BLACKSTOCK.